Nov. 17, 1953  E. MAHLE  2,659,638
PISTON RING
Filed Nov. 1, 1950  2 Sheets-Sheet 1
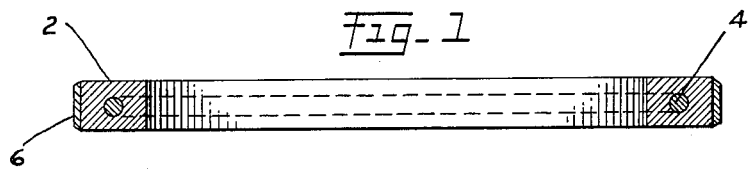
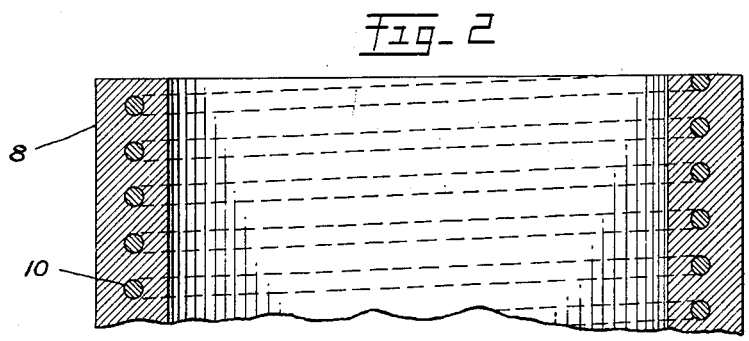
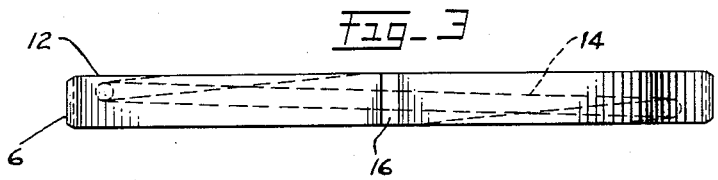
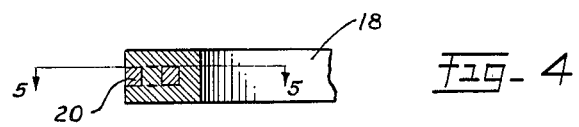
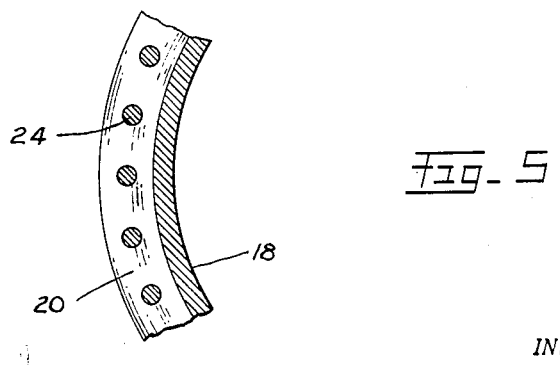
INVENTOR.
ERNST MAHLE
BY
Bailey, Stephens & Huettig
ATTORNEYS Nov. 17, 1953 — E. MAHLE — 2,659,638
PISTON RING
Filed Nov. 1, 1950 — 2 Sheets-Sheet 2
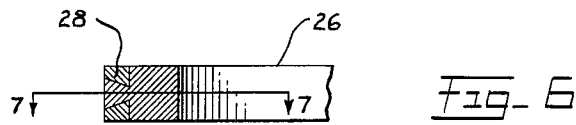
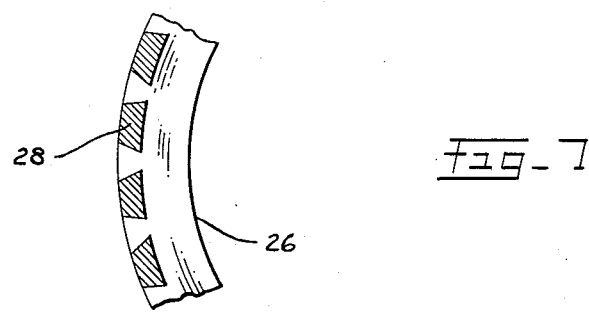
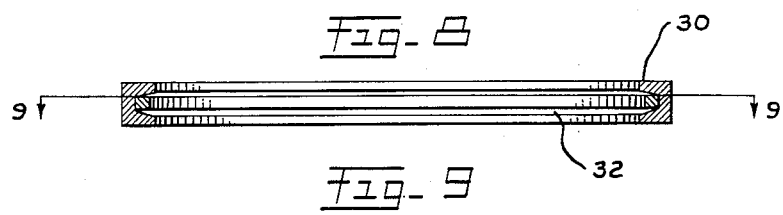
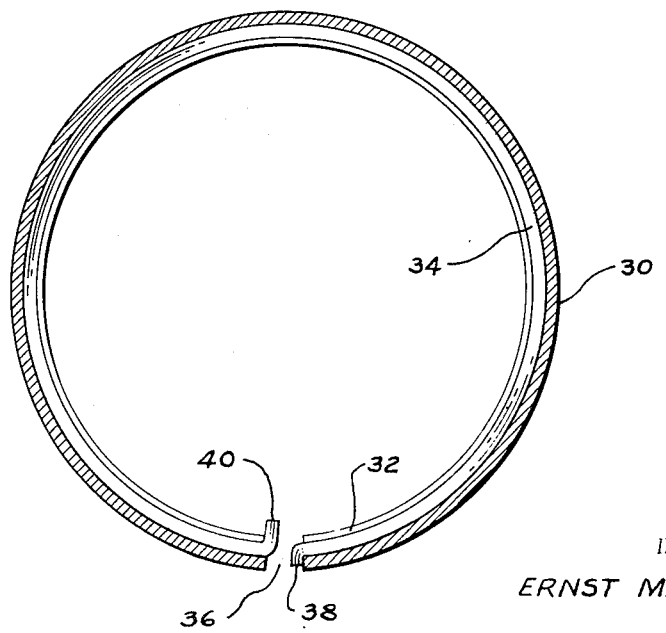
INVENTOR
ERNST MAHLE
BY Bailey, Stephens & Huettig
ATTORNEYS Patented Nov. 17, 1953

2,659,638

UNITED STATES PATENT OFFICE 2,659,638

PISTON RING

Ernst Mahle, Baden Stuttgart, Wurttemberg, Germany

Application November 1, 1950, Serial No. 193,489

2 Claims. (Cl. 309—29)

This invention relates to the construction of piston rings composed of light metals and the alloys thereof. In particular, the invention is directed to a bimetallic ring which for the greater part, is formed of light metal.

Piston rings for internal combustion engines are commonly formed of grey cast iron or steel. Iron rings have good wearing and running properties, but lack sufficient springiness. Steel rings have the spring quality, but lack the wearing and running properties. Both types of rings have the disadvantage of being heavy, and their weight can cause hammering and destruction of the ring grooves, especially in thermically highly stressed light metal pistons. Piston rings composed entirely of light metals have the advantages of reduced weight and of a better heat conduction from the piston to the cylinder wall, but have heretofore been deficient in both wearing and running properties and of springiness. The embedding of a light metal ring inside an iron or steel ring, as disclosed in German Patent No. 740,323, only partially reduces the weight of the ring, and fails to use the light metal heat conducting properties.

The objects of this invention are to produce a piston ring primarily consisting of light metal which has both good wearing and running properties as well as good springiness; to produce a light metal piston ring which retains the advantage of heat transfer from the piston to the cylinder wall; and to produce methods for forming the novel ring.

Generally, these objects are obtained by combining a spring member with a light metal piston ring, the light metal constituting the major bulk of the ring and having at least a part of the light metal surfaces engageable with both the piston and cylinder wall so that heat is conducted through the light metal. Such is accomplished by casting the spring members, which may be in the form of a helix, in a light metal cylinder and then cutting rings from the cylinder, or by embedding ring members in the outer wall of said cylinder, or by inserting an expanding spring member in a groove formed in the inner face of the piston ring. The wearing property of the light metal ring is taken care of either by giving the outer wearing face of the ring a thin plating of a hard metal such as chromium, or by having the hard metal spring member partially exposed in said face.

The means by which the objects of the invention are obtained, are more fully described with reference to the accompanying drawings, in which:

Figure 1 is a cross-sectional view through a piston ring formed according to this invention;

Figure 2 is a cross-sectional view through a cylinder from which piston rings of a modified form are cut;

Figure 3 is a front elevational view of a ring cut from the cylinder of Figure 2;

Figure 4 is a partial cross-sectional view of a modification;

Figure 5 is a cross-sectional view on the line 5—5, Figure 4;

Figure 6 is a partial cross-sectional view of a modification;

Figure 7 is a cross-sectional view on the line 7—7 of Figure 6;

Figure 8 is a cross-sectional view of a modification;

Figure 9 is a cross-sectional view on the line 9—9, Figure 8.

In Figure 1, the piston ring 2 is composed of light metal, and has embedded therein a relatively heavy spring member 4 composed of, for example, spring steel. The major bulk of the ring is composed of light metal, the light metal surfaces being adapted to contact both the piston and the cylinder wall for heat conducting purposes. A thin chromium layer 6 may be applied by electrodeposition to the outer circumferential wearing face of the ring, this layer being so thin as not to interfere materially with the heat conducting property of the ring.

Figure 2 shows a light metal cylinder 8 in which is embedded a helical spring member 10. A ring 12 cut from this cylinder will have a spring member 14 positioned therein as shown by the dotted outline in Figure 3. Member 14 is cut obliquely and is exposed on the upper and lower ring flank surfaces, and the ring is split at 16 intermediate the two free ends of member 14 so that the full spring effect of member 14 is obtained. Depending upon the strength of the materials used, the free ends of member 14 can be either circumferentially separated, or overlapped so that the cross-sectional area relation between the member 14 and ring 12 is such to maintain approximately a body of uniform bending resistance. Slot 16 splits the ring between said free ends.

As seen in Figures 4 and 5, light metal ring 18 has embedded therein a spring member 20, one edge of which is exposed and flush with the outer face of ring 18. Member 20 is an annulus having a plurality of openings 24 through which the light metal axially extends to anchor member 20 in place. The exposed edge of member 20 provides a hard wearing surface for the light metal ring, while at the same time the advantages of heat conductivity are maintained as the light metal in the ring will contact both the piston and the cylinder wall.

A modification of this form of ring is shown in Figures 6 and 7, wherein the light metal ring 26 has an annular metal spring member 28 embedded in the face thereof, this member having a plurality of cone shaped openings therein through which the light metal radially extends to anchor member 28. As seen in Figure 6, member 28 is exposed on the upper and lower surfaces of ring 26, as well as being exposed on the wearing surface of ring 26.

A further form of the invention is shown in Figures 8 and 9 in which light metal piston ring 30 has a channel or groove 32 extending around the inner face of the ring. Into this groove is sprung an outwardly expanding spring member 34. Ring 30 is split to form a gap 36, and one free end 38 of ring 34 is bent to extend into gap 36. The other free end 40 is bent radially inward in gap 36 and projects beyond the inner face of ring 30, and is adapted to engage in a hole in the piston groove to lock the ring in place. Such construction is particularly useful in two-stroke internal combustion engines. It is also desirable to give ring 34 a rectangular cross-section and forming it as a body of uniform bending resistance.

The invention permits the use of spring members of a great number of cross-sectional shapes from which the best uniform springiness throughout the length of the ring can be obtained. A combination of the light metal ring and heavy metal spring member can be produced by casting in sand, chill molding or die casting, by pressing in, forging, or welding. The metal insert may be precoated with a coating easily soluble in, or weldable to, the light metal. The piston ring comprises a bimetallic structure in which the spring member preferably has a smaller coefficient of expansion than the light metal. Thus, as illustrated in Figures 4 to 7, the placing of the spring member adjacent the outer circumference of the ring produces a structure in which the expansion of the light metal is countered by the spring member. In all the forms of the invention, a wearing surface of chromium can be applied to the outer face of the ring.

Having now described the means by which the objects of the invention are obtained, I claim:

1. A light metal piston ring comprising a one piece light metal ring body, a groove in the inner circumferential face of said light metal body, a heavy metal spring member mounted in said groove and being at least partially enclosed by said body, said spring member having a rectangular cross-section and constituting a body of uniform bending resistance, said ring body being split with the free ends of said spring member extending, respectively, inwardly and outwardly through said split, and said body constituting the major bulk of said ring and having surfaces through which said body serves as the principal heat conducting medium between a piston and a cylinder wall.

2. A light metal piston ring as in claim 1, the inwardly extending free end of said spring member projecting inwardly beyond the inner circumferential face of said light metal ring body.

ERNST MAHLE.

References Cited in the file of this patent

UNITED STATES PATENTS

| Number | Name | Date |
|---|---|---|
| 1,200,641 | Muchnic | Oct. 10, 1916 |
| 1,348,641 | Hachmann | Aug. 3, 1920 |
| 1,407,714 | Whitcomb | Feb. 28, 1922 |
| 1,415,620 | Albrecht | May 9, 1922 |
| 1,450,200 | Bruninga | Apr. 3, 1923 |
| 1,475,680 | Borkey | Nov. 27, 1923 |
| 2,229,622 | Bunn | Jan. 21, 1941 |
| 2,427,333 | Wainwright et al. | Sept. 9, 1947 |

FOREIGN PATENTS

| Number | Country | Date |
|---|---|---|
| 129,144 | Germany | Mar. 17, 1902 |
| 408,834 | Germany | Jan. 26, 1925 |
| 341,798 | Great Britain | Jan. 22, 1931 |
| 889,267 | France | Sept. 27, 1943 |
| 974,020 | France | Sept. 20, 1950 |